Patented Apr. 11, 1933

1,903,624

UNITED STATES PATENT OFFICE

ROY T. HURLEY, OF DOBBS FERRY, NEW YORK, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

MOTOR FUEL

No Drawing.    Application filed July 16, 1928. Serial No. 293,316.

My present invention relates to an improved motor fuel having anti-knock qualities. Among the various anti-knock ingredients containing metals which have beeen proposed, tetraethyl lead has thus far been the most widely adopted. Its use, however, is not free from difficulties, chief of which are its poisonous character both before and after combustion and the fact that the use of the pure substance results in the deposition of layers of lead oxide of objectionable character which adhere to the cylinder walls, valves and spark plugs, and which necessitate the presence in the cylinder of some substance which by its solvent or other action prevents or removes such layers as they are formed. Such aids to the use of tetraethyl lead, the most successful of which have been certain halogen compounds, have, however, an appreciable corrosive effect upon the metal parts of the engine, and their use is therefore limited.

Other gasoline soluble, volatile metal compounds, particularly the carbonyls of iron, nickel, and cobalt, have been found to possess marked anti-knock properties. Of these, iron carbonyl has many advantages, including its relative non-poisonous character, stability, availability and ease of manufacture. Its use, however, is attended with the difficulty that it causes the deposition of a layer or coating of iron oxide on the spark plug insulators, the dielectric strength of which coating rapidly decreases as the temperature in the cylinder increases until after a time the cylinder misses fire, because of the more or less complete short circuiting of the spark plug electrode.

I have now discovered that the conducting action of the deposit formed by iron carbonyl on the spark plug may be rendered ineffective by incorporating in the fuel mixture a corrective agent furnishing combustion products which are likewise deposited on the spark plugs but which are themselves non-conducting and by their presence nullify the conducting effect of such oxide layers.

Furthermore I have found the use of the corrective agents mentioned effective not only to inhibit its conducting action of the oxide layer as it is deposited but its continued use to reduce to a desired degree the conductivity of such layers as are already formed.

In the class of substances mentioned as corrective agents those which I have thus far found most effective are volatile gasoline soluble compounds of lead and of nickel. Of these, I prefer respectively tetraethyl lead and nickel carbonyl. As preferred examples of my improved anti-knock fuel mixture, I give the following:

1. 1 gallon of low compression fuel such as ordinary gasoline,
   7 cc. iron carbonyl,
   0.35 cc. tetraethyl lead.

Instead of the pure tetraethyl lead I may use an equivalent amount of the so-called ethyl fluid containing in addition to the tetraethyl lead, di-methyl bromide and monochlornaphthalene although the use of the pure substance is to be preferred.

2. 1 gallon of low compression fuel such as ordinary gasoline,
   7 cc. iron carbonyl,
   0.1 cc. nickel carbonyl.

The foregoing proportions may be varied considerably and beneficial results obtained. Thus where the spark plugs have been badly coated with a conducting oxide, the amount of the corrective agent may be increased somewhat, whereas for ordinary use the proportion thereof may be considerably decreased from the values given and satisfactory action had.

However, I may say that the iron carbonyl may be utilized with the gasoline in the proportion of about 5 to 18 cc. of iron carbonyl to each gallon of gasoline, depending upon the compression ratio and other factors effecting detonation. If the compression ratio is high, more iron carbonyl will be used. The tetraethyl may be used as a corrective in amounts varying from 0.1 cc. to 2 cc. for each gallon of gasoline. In all cases it is desirable to keep the proportion of tetraethyl lead as low as possible and still do the work. The amount of corrective agent required depends in considerable part upon the design and operating temperature of the spark plug. The cooler the temperature at which the plug operates, the less corrective agent is necessary. The amount of corrective agent also depends upon the amount of iron carbonyl used, the larger quantity of corrective being used if a larger amount of iron carbonyl is employed. The iron carbonyl tends to foul the spark plug, and the corrective tends to prevent this.

The effect of my improved corrective agents is best seen by the following results of tests in which the effective resistance of the spark plug insulator is measured while the engine is being run:

A mixture of gasoline and iron carbonyl in a proportion of one gallon gasoline to 15 cc. $Fe(CO)_5$ was run in an engine until the effective resistance of the coated spark plug insulator fell to 4 megohms at which point the engine started to miss. Under conditions of the test one hour and thirty minutes were required to bring about this condition, starting with a clean plug. Then tetraethyl lead in the proportion of 0.2 cc. $Pb(C_2H_5)_4$ to one gallon of the mixture was added and the operation of the engine continued for twenty minutes during which time the effective resistance of the spark plug insulator had risen to 6 megohms, a value above that at which missing took place. The motor was then stopped and operation continued with a fuel mixture consisting of gasoline and iron carbonyl alone, whereupon in ten minutes the resistance had dropped to 3 megohms, or 1 megohm below the value at which missing was observable. To the same gasoline and iron carbonyl mixture was now added 0.1 cc. nickel carbonyl; after thirty minutes of operation the resistance had attained a value of 6 megohms at which the engine continued to operate satisfactorily.

I am unable at this time to present a theory of action of my improved corrective agents which is in every respect satisfactory and is exclusive of other theories. However, I may state that the action of my corrective agents is as if the non-conducting particles deposited on the insulating surface simultaneously with the conducting particles in effect surround such conducting particles so as to render the whole layer substantially non-conducting. When a spark plug having a previously formed conducting layer of iron oxide is submitted to the action of my improved correctives the action is somewhat more difficult to explain. It is suggested, however, that their action may be due to either or both of the following causes: (1) The newly formed layer containing the oxide of the corrective metal, which layer is relatively non-conducting, acts to shield the inner conductive layer from the radiant heat, and for that reason keeps down its temperature and correspondingly its conductive effect. (2) The oxide of the corrective metal, being finely divided and very likely of colloidal dimensions, is able to penetrate even the conductive coating so as to render it non-conducting.

In addition to the foregoing it should be kept in mind that the oxides of the corrective metals may also have the property of absorbing heat during the firing of the charge in the cylinder, this heat being given off later during the expansion stroke of the piston. In this manner the coating of iron oxide is prevented from attaining a sufficiently high temperature during the combustion period to render it conductive to a point where a miss occurs.

The advantages of my invention will be easily apparent. In the first place, even where lead is used as the corrective agent the amount present is reduced very greatly over that obtaining in the usual leaded gasoline, being only about one-tenth or less of such amount, whereby the danger of lead poisoning is minimized. In addition, because of the very small amount of lead present, the use of the halogen compounds mentioned which, as stated, have an appreciable corrosive effect upon the engine parts, may be entirely eliminated. Furthermore, by the use of other metals having the properties specified for such corrective agents as for example nickel, the danger of poisoning, at least so far as products of combustion are concerned may be entirely eliminated. It will furthermore be noted that following the disclosure herein the corrective agent may have the additional advantage of being a valuable anti-knock ingredient in itself whose properties in this respect are thus added to those of the main ingredient.

My invention then consists broadly in the use with a metallic anti-knock compound which under the conditions obtaining in the engine cylinder will form a conducting deposit on the spark plugs, of a compound which will form a product depositing with the conducting deposit of such a nature that the combination is non-conducting.

I claim:

An improved motor fuel comprising a low compression fuel, an anti-knock substance comprising iron carbonyl, and a corrective agent comprising tetraethyl lead, the ratio of anti-knock substance and corrective agent being substantially ten to one.

In testimony whereof I have affixed my signature to this specification.

R. T. HURLEY.